United States Patent
Topiwala

(10) Patent No.: US 8,520,736 B2
(45) Date of Patent: Aug. 27, 2013

(54) REAL-TIME SUPERRESOLUTION AND VIDEO TRANSMISSION

(75) Inventor: Pankaj Topiwala, Cocoa Beach, FL (US)

(73) Assignee: FastVDO, LLC, Columbia, MD (US)

( * ) Notice: Subject to any disclaimer, the term of this patent is extended or adjusted under 35 U.S.C. 154(b) by 354 days.

(21) Appl. No.: 12/760,265

(22) Filed: Apr. 14, 2010

(65) Prior Publication Data

US 2010/0290529 A1 Nov. 18, 2010

Related U.S. Application Data

(60) Provisional application No. 61/169,130, filed on Apr. 14, 2009.

(51) Int. Cl.
*H04N 7/26* (2006.01)
*H04N 7/50* (2006.01)

(52) U.S. Cl.
USPC ................................. 375/240.16; 375/240.17

(58) Field of Classification Search
None
See application file for complete search history.

(56) References Cited

U.S. PATENT DOCUMENTS

| | | | | |
|---|---|---|---|---|
| 6,434,280 | B1 * | 8/2002 | Peleg et al. | 382/299 |
| 7,379,612 | B2 * | 5/2008 | Milanfar et al. | 382/254 |
| 7,397,858 | B2 * | 7/2008 | Garrido et al. | 375/240.29 |
| 7,643,690 | B2 * | 1/2010 | Suzuki et al. | 382/236 |
| 8,374,464 | B2 * | 2/2013 | Toda | 382/299 |
| 2003/0189983 | A1 * | 10/2003 | Hong | 375/240.27 |
| 2004/0017852 | A1 * | 1/2004 | Garrido et al. | 375/240.16 |
| 2004/0022318 | A1 * | 2/2004 | Garrido et al. | 375/240.11 |
| 2005/0057687 | A1 * | 3/2005 | Irani et al. | 348/443 |
| 2005/0207500 | A1 * | 9/2005 | Bober | 375/240.22 |
| 2007/0206678 | A1 * | 9/2007 | Kondo | 375/240.17 |
| 2007/0247547 | A1 * | 10/2007 | Liu et al. | 348/458 |
| 2007/0297513 | A1 * | 12/2007 | Biswas et al. | 375/240.16 |
| 2008/0084934 | A1 * | 4/2008 | Agrawal | 375/240.27 |
| 2008/0117975 | A1 * | 5/2008 | Sasai et al. | 375/240.16 |

OTHER PUBLICATIONS

Park et al, "Super-Resolution Image Reconstruction: A Technical Overview", IEEE Signal Processing Magazine, May 2003, pp. 21-36.*

Park, et al, "Super-Resolution Image Reconstruction: A Technical Overview", IEEE Signal Processing Magazine, May 2003, pp. 21-36 reviews methods of super-resolution image reconstruction.*

Sullivan, et al, "Video Compression—From Concepts to the H.264/AVC Standard", Proceedings of the IEEE, vol. 39, No. 3, Jan. 2005, pp. 18-31.*

Teklap, et al, "High-Resolution Image Reconstruction from Lower-Resolution Image Sequences and Space-Varying Image Restoration", IEEE 0-7803-0532-9/92, Sep. 1992, pp. III-169 to III-172.*

* cited by examiner

*Primary Examiner* — Gims Philippe
*Assistant Examiner* — Reza Aghevli
(74) *Attorney, Agent, or Firm* — Dickstein Shapiro LLP

(57) ABSTRACT

A method and system of performing real-time video super-resolution. A decoder receives a data stream representing a low resolution video and including global motion vectors relating to image motion between frames of the low resolution video. The decoder uses the global motion vectors from the received data stream and multiframe processing algorithms to derive a high resolution video from the low resolution video. The sharpness of the high resolution video may be enhanced.

43 Claims, 19 Drawing Sheets

500 →

| MOTION VECTOR (MV) | PAYLOAD 1 | PAYLOAD 2 | |
|---|---|---|---|
| | | MV < 0 | MV > 0 |
| \|MV\| < 1 | \|MV\|.255 | 10 | 20 |
| 1 ≤ \|MV\| < 10 | \|MV\|.25 | 30 | 40 |
| 10 ≤ \|MV\| < 100 | \|MV\|.2 | 50 | 60 |
| \|MV\| ≥ 100 | \|MV\| | 70 | 80 |

| Logic Utilization: | |
|---|---|
| Number of Slice Flip Flops | 21,264 out of 178,176 (11%) |
| Number of 4 input LUTs | 66,284 out of 178,176 (37%) |
| Logic Distribution: | |
| Number of occupied Slices | 40,999 out of 89,088 (46%) |
| Number of Slices containing only related logic | 40,999 out of 40,499 (100%) |
| Number of Slices containing unrelated logic | 0 out of 40,999 (0%) |
| Resource Utilization: | |
| Number of FIFO16/RAMB16s | 227 out of 336 (67%) |
| Number of DSP48s | 91 out of 96 (94%) |

FIG. 21

| No | I/P Resolution | O/P Resolution | Scaling | FPS w/FPGA | FPS w/S/W |
|---|---|---|---|---|---|
| 1 | 320 X 240 | 1280 X 960 | 16X | 26.2 | 1.7 |
| 2 | 256 X 256 | 1024 X 1024 | 16X | 30.6 | 2.1 |
| 3 | 176 X 144 | 704 X 576 | 16X | 65.8 | 5.9 |
| 4 | 128 X 128 | 512 X 512 | 16X | 73.7 | 9.5 |

FIG. 22

REAL-TIME SUPERRESOLUTION AND VIDEO TRANSMISSION

CROSS-REFERENCE TO RELATED APPLICATIONS

This application claims priority to U.S. Provisional Patent Application Ser. No. 61/169,130, filed Apr. 14, 2009, the disclosure of which is hereby incorporated by reference in its entirety.

FIELD OF THE INVENTION

This invention relates to systems, tools, and devices for the processing and coding of video and transmitting through communication channels, including software and hardware.

BACKGROUND OF THE INVENTION

There are a number of video superresolution and video transmission systems individually in the prior art, but there has not been an integrated system of real-time superresolution and advanced video coding and transmission. The main innovation is to integrate key elements of motion registration, non-uniform image interpolation, image regularization, and image post-processing, along with highly compressed video transmission, in a unique form that directly produces, in real-time, high resolution videos at the decoder side using low resolution encoded videos. The invention also relates to video coding using international video coding standards such as those from the International Standards Organization (MPEG-1, MPEG-2, MPEG-4) and the International Telecommunications Union (H.263, H.264 and the upcoming H.265), in particular the current standard, H.264/AVC for video. This invention further relates to video file and stream wrappers such as the MPEG-2 transport stream and the MP4 file format, which can contain useful auxiliary information. This invention further relates to the video quality enhancement for a wide variety of surveillance and reconnaissance systems, and even consumer electronics products, such as handheld digital cameras. For illustrative purposes, we often focus on specific resolutions of VGA and QVGA, and the H.264 video standard, but the invention is substantially broader.

In many imaging applications high resolution (HR) images are desired for further processing. High resolution images are images with high pixel density. High resolution images offer more details compared to low resolution (LR) images. For example, high resolution images may be useful in medical diagnosis. Similarly, high resolution images are also desired in many defense applications like surveillance and in satellite imagery. Although high resolution images are desired ubiquitously it is not possible in most scenarios to sense HR images. This is due primarily to the usual size, weight, power and cost constraints. To overcome these limitations inherent in almost any sensing system, we try to extend the ranges and conditions under which a sensor can provide imagery by using signal processing techniques to enhance the resolution of an image from the sensed multiple low resolution images. Such a system will improve the speed for F2T2EA (Find, Fix, Track, Target, Engage, and Assess). This technique of enhancing LR images into HR images is called superresolution (SR). Superresolution images at extended ranges admit many different solutions, each equating to a different problem to solve.

The basic physical problems to overcome are the limits that physical geometry and optics of any camera system impose on the resolution performance, and the environmental factors such as turbulence, particulates, and humidity that contribute to degraded image quality. The advantage of the superresolution method is that it costs less compared to a HR hardware and the same LR hardware can be used for observations. It provides better image quality and resolution than a comparable imaging system of the same size, with the goal of exceeding the diffraction and seeing limits, and negating severe environmental effects.

A small description of the basic concept of superresolution will be provided in the following paragraphs. When there is a small motion between frames, the data in low resolution images can be used to fill the pixels in the desired high resolution image. The small motion between frames is referred to as the sub-pixel displacement as shown in FIG. 1. Since the imaging systems are discrete the pixels do not capture all the information. For example the information in the image between the pixels (○) is averaged and hence lost. Instead this information could be captured in the other frames due to the sub-pixel displacement as shown in FIG. 1. This fact can be used to fuse the low-resolution frames to form a high resolution frame. The pixels (Δ) have a strict sub-pixel displacement whereas the pixels (+) have a pixel plus sub-pixel displacement. To reconstruct the HR images from the LR frames first the model which generates these LR images from the HR images is specified so that the reconstruction algorithms are designed to perform the inverse operation of this model. The model showing the generation of K LR images $g_k$ from HR image i is shown in FIG. 2, and given by $$g_k = W_k i + \eta_k \tag{1}$$

where i and $g_k$ are the reformatted vectors and $W_k$ models the generation process and $\eta_k$ is a noise vector. 100 is an example of sub-pixel displacement. The grid of pixels (○) is the reference image frame. The grids of pixels (Δ and +) with sub-pixel displacements are drawn with respect to the reference image frame.

FIG. 2 illustrates a model 200 generating LR images from the HR images. The motion block refers to the translation and rotation of the LR images. The blur is induced due to motion etc. The decimation block models the down-sampling which results in lower resolution.

The steps of superresolving the K LR images involve reverting each of the blocks in the above model. The motion block is accounted for by finding the registration values between the reference LR image and the K−1 non-reference frame LR images. After this the effects of down-sampling are accounted by populating the desired HR image with the registered LR images and then interpolating the remaining pixels. After this a de-blurring process is applied to remove the effects of the blur. Different methods can vary in these three stages of superresolution. These methods can be broadly divided into three categories.

The first category is the SR process, wherein the SR process is straightforward where the LR images are registered relative to the reference LR image. The HR grid is estimated by using the non-uniform interpolation method. The de-blurring process involves methods like Wiener filtering. One such method is described herein. In the second kind of process the interpolation step is replaced by estimating the HR image from the LR images in the frequency domain. In the third kind of process, the conversion to a HR image involves a regularization step which accounts for the lack of sufficient number of LR images and error prone blur models. These methods can again be divided into deterministic and stochastic reconstruction.

Gradient-Based Registration

In this section, we describe a prior art algorithm presented for superresolution. In this algorithm, the registration between non-reference LR frames and the reference LR frames is a modified version of other prior art algorithms. The registration algorithm disclosed herein is a gradient based registration algorithm but valid only for shifts of one LR pixel widths. Another registration disclosed herein is an iterative technique useful for larger shifts.

Let the reference LR image be $g_1(x,y)$. Then the non-reference LR images can be represented as $$g_k(x,y) = g_1(x+tx_k, y+ty_k) \qquad (2)$$

where $tx_k, ty_k$ are the horizontal and vertical shifts which we need to estimate in this registration process. Considering the first three terms of the Taylor's series we get $$g_k(x, y) = g_1(x, y) + tx_k \frac{\partial g_1(x, y)}{\partial x} + ty_k \frac{\partial g_1(x, y)}{\partial y} \qquad (3)$$

Since x, y are continuous variables, we approximate with discrete variables m, n and then to estimate $tx_k, ty_k$ by applying the least squares method. We apply least squares by minimizing the error term $$E_k(tx_k, ty_k) \approx \qquad (4)$$

$$\sum \left[ g_k(m, n) - g_1(m, n) - tx_k \frac{\partial g_1(m, n)}{\partial m} - ty_k \frac{\partial g_1(m, n)}{\partial n} \right]^2$$

By differentiating with respect to $tx_k, ty_k$ we get $M \cdot S = V$ or $S = M^{-1} \cdot V$ where $S = [tx_k, ty_k]^T$ and $$M = \begin{bmatrix} \sum \left(\frac{\partial g_1(m,n)}{\partial m}\right)^2 & \sum \frac{\partial g_1(m,n)}{\partial m}\frac{\partial g_1(m,n)}{\partial n} \\ \sum \frac{\partial g_1(m,n)}{\partial m}\frac{\partial g_1(m,n)}{\partial n} & \sum \left(\frac{\partial g_1(m,n)}{\partial n}\right)^2 \end{bmatrix} \qquad (5)$$

and $$V = \begin{bmatrix} \sum (g_k(m,n) - g_1(m,n))\frac{\partial g_1(m,n)}{\partial m} \\ \sum (g_k(m,n) - g_1(m,n))\frac{\partial g_1(m,n)}{\partial n} \end{bmatrix} \qquad (6)$$

To account for the larger shifts the iterative techniques in the prior art are used. First the initial registration values are estimated. Then the LR image $g_k(x,y)$ is shifted by that amount and the same procedure is applied until the registration values are smaller than a specified value.

Back Projection Algorithm

The basic idea of improving the high resolution image using back-projection is borrowed from computer aided tomography (CAT), where the X-ray beam moves all around the patient, scanning from hundreds of different angles and the computer takes all this information and puts together a 3-D image of the body. In superresolution, low resolution images are projections of the original scene after blurring and decimation. Herein, we use a model similar to that described by Farsui, which has a regularization term along with the gradient back-projection term. Let D, F and H denote decimation, warping and blurring operations, X and Y represent original and low resolution images. The high resolution image is iteratively estimated by optimizing the following equation $$\hat{X} = \underset{X}{\mathrm{argmin}} \left[ \sum_{k=1}^{N} \|D_k H_k F_k X - Y_k\|_1 + \lambda \sum_{\substack{l=-P\\l+m\geq 0}}^{P} \sum_{m=0}^{P} \alpha^{|m|+|l|} \|X - S_x^l S_y^m X\|_1 \right] \qquad (7)$$

where $S_x^l$ and $S_y^m$ are matrices that shift the image X by l and m pixels in horizontal and vertical directions respectively. N is the number of low resolution frames considered to generate one high resolution frame. The first term represents the similarity cost and the second term is the regularization term. The scalar weight $\alpha (0<\alpha<1)$ is applied to give a spatially decaying effect to the summation of the regularization terms. $\lambda$ is the regularization factor. The solution to the above equation using steepest descent as given in the prior art is adopted here.

$$\hat{X}_{n+1} = \hat{X}_n - \beta \left\{ \sum_{k=1}^{N} F_k^T H_k^T D_k^T \mathrm{sign}(D_k H_k F_k \hat{X}_n - Y_k) + \right. \qquad (8)$$

$$\left. \lambda \sum_{\substack{l=-P\\l+m\geq 0}}^{P} \sum_{m=0}^{P} \alpha^{|m|+|l|} [I - S_y^{-m} S_x^{-l}] \mathrm{sign}(\hat{X}_n - S_x^l S_y^m \hat{X}_n) \right\}$$

where $\beta$ is the scalar denoting the step size in the direction of gradient. $S_x^{-l}$ and $S_y^{-m}$ define the transpose of the matrices $S_x^l$ and $S_y^m$, respectively with opposite shifting directions.

Partition Weighted Sum (PWS) Filtering

The key to successful motion estimation and compensation at the subpixel level is accurate interpolation. Standard interpolators (e.g., bilinear, bicubic, and spline) tend to smooth images and may not fully preserve the fine image structure. One promising nonlinear filtering technique, Partition Weighted Sum (PWS) filters, have recently been shown to be very effective in interpolation applications where resolution enhancement or preservation is critical. The PWS filter uses a moving window that spans a set of N samples and moves across the image in a raster scan fashion. At each image position the samples spanned by the window form a spatial observation vector, x. The PWS uses vector quantization (VQ) to partition the observation space and assign each observation vector into one of the M partitions. Associated with each partition is a finite impulse response (FIR) Wiener filter that is "tuned" for data falling into that partition using suitable training data. After an observation vector is classified, the corresponding filter is applied. Because the filter is spatially adaptive, it is well suited to handle nonstationarities in the signal and/or noise statistics. A block diagram of the prior art PWS filter structure is shown in FIG. 3.

FIG. 3 depicts a block diagram illustrating a prior art partition weighted sum filter. A moving window provides the samples in the vector x. Based on the pixel structure present in that particular window position, one set of filter weights is selected and applied, as indicated by the position of the selection arrow.

Note that $w_i$ is an N×1 vector of weights for partition i, and the partition function $p(\cdot): R^N \mapsto \{1, 2, \ldots, M\}$ generates the partition assignment. Using VQ partitioning, x is compared with a codebook of representative vectors. An example of a codebook generated with a LBG algorithm is shown in FIG. 4. The index of the codeword closest in a Euclidean sense to the observation vector is selected as the partition index. The standard Wiener filter can be considered a special case of the PWS filter with only one partition. Because the filter is spatially adaptive, it is well suited to handle nonstationarities in the signal and/or noise statistics. Previous work has shown the effectiveness of the PWS filter in an image de-noising application. Recently this filter has been applied to image deconvolution, superresolution and demosaicing. For interpolation applications, the filter estimates missing grid points using a weighted sum of the present neighboring pixels. The weights depend on the VQ partition for the local region. Thus, unlike bilinear interpolation, for example, the PWS approach uses more neighboring pixels and weights them differently depending on the intensity structure (edge, line, texture, etc). This allows it to preserve detail that can be lost with other interpolators.

FIG. 4 is a vector quantization codebook for a prior art PWS filter. This codebook corresponds to an M=25 vector codebook for a 5×5 moving window filter. Notice how the codebook captures a variety of common structures including flat, edges, lines, etc. Thus, filters can be tuned for each type of structure in the PWS framework.

Other developments are motivated by recent results in sparse signal representation, which ensure that linear relationships among high-resolution signals can be precisely recovered from their low-dimensional projections. We now briefly summarize what has been done in other areas.

We try to infer the high-resolution patch for each low resolution patch from the input. For this local model, we have two dictionaries $D_l$ and $D_h$: $D_h$ is composed of high resolution patches and $D_l$ is composed of corresponding low-resolution patches. We subtract the mean pixel value for each patch, so that the dictionary represents image textures rather than absolute intensities. For each input low-resolution patch y, we find a sparse representation with respect to $D_l$. The corresponding high resolution patches $D_h$ will be combined according to these coefficients to generate the output high-resolution patch x. The problem of finding the sparsest representation of y can be formulated as:

$$\min\|\alpha\|_0 \, s.t. \, \|FD_l\alpha - Fy\|_2^2 \leq \epsilon \quad (9)$$

where F is a (linear) feature extraction operator. The main role of F in (9) is to provide a perceptually meaningful constraint on how closely the coefficients must approximate y. Although the optimization problem (9) is NP-hard in general, recent results [15, 16] indicate that as long as the desired coefficients are sufficiently sparse, they can be efficiently recovered by instead minimizing the $l_1$-norm, as follows:

$$\min\|\alpha\|_1 \, s.t. \, \|FD_l\alpha - Fy\|_2^2 \leq \epsilon \quad (10)$$

Lagrange multipliers offer an equivalent formulation $$\min\lambda\|\alpha\|_1 + \frac{1}{2}\|FD_l\alpha - Fy\|_2^2 \quad (11)$$

where the parameter λ balances sparsity of the solution and fidelity of the approximation to y.

Solving (11) individually for each patch does not guarantee compatibility between adjacent patches. We enforce compatibility between adjacent patches using a one-pass algorithm similar to that of [17]. The patches are processed in raster-scan order in the image, from left to right and top to bottom. We modify (10) so that the superresolution reconstruction $D_h\alpha$ of patch y is constrained to closely agree with the previously computed adjacent high resolution patches. The resulting optimization problem is $$\min\|\alpha\|_1 \, s.t. \, \|FD_l\alpha - Fy\|_2^2 \leq \epsilon_1, \|PD_h\alpha - w\|_2^2 \leq \epsilon_2 \quad (12)$$

where the matrix P extracts the region of overlap between current target patch and previously reconstructed high-resolution image, and ω contains the values of the previously reconstructed high-resolution image on the overlap. The constrained optimization (12) can be similarly reformulated as:

$$\min\lambda\|\alpha\|_1 + \frac{1}{2}\|\tilde{D}\alpha - \tilde{y}\|_2^2 \quad (13)$$

where $$\tilde{D} = \begin{bmatrix} FD_l \\ \beta PD_h \end{bmatrix} \text{ and } \tilde{y} = \begin{bmatrix} Fy \\ \beta w \end{bmatrix}.$$

The parameter β controls the tradeoff between matching the low-resolution input and finding a high-resolution patch that is compatible with its neighbors. Given the optimal solution $\alpha^*$ to (13), the high resolution patch can be reconstructed as $x = D_h\alpha^*$.

Notice that (10) and (12) do not demand exact equality between the low-resolution patch y and its reconstruction $D_l\alpha$. Because of this, and also because of noise, the high-resolution image $X_0$ produced by the sparse representation approach of the previous section may not satisfy the reconstruction constraint exactly. We eliminate this discrepancy by projecting $X_0$ onto the solution space of DHX=Y, computing $$X^* = \arg\min_X \|X - X_0\| \text{ s.t. } DHX = Y \quad (14)$$

The solution to this optimization problem can be efficiently computed using the back-projection method, originally developed in computer tomography and applied to superresolution in [18, 19]. The update equation for this iterative method is $$X_{t+1} = X_t + ((Y - DHX_t)\uparrow s)^*p \quad (15)$$

where $X_t$ is the estimate of the high-resolution image after the t-th iteration, p is a "backprojection" filter, and ↑s denotes upsampling by a factor of s.

We take result $X^*$ from backprojection as our final estimate of the high-resolution image. This image is as close as possible to the initial superresolution $X_0$ given by sparsity, while satisfying the reconstruction constraint. The entire superresolution process is summarized as Algorithm 1.

Algorithm 1 (Superresolution Via Sparse Representation)
1. Input: training dictionaries $D_l$ and $D_h$, a low-resolution image Y.
2. For each 3×3 patch y of Y, taken starting from the upper-left corner with 1 pixel overlap in each direction,
   Solve the optimization problem with $\tilde{D}$ and $\tilde{y}$ defined in (13):

$$\min\lambda\|\alpha\|_1 + \frac{1}{2}\|\tilde{D}\alpha - \tilde{y}\|_2^2.$$

Generate the high-resolution patch $x = D_h\alpha^*$. Put the patch x into a high-resolution image $X_0$.

3. End

4. Using back-projection, find the closest image to $X_0$ which satisfies the reconstruction constraint:

$$X^* = \underset{X}{\mathrm{argmin}} \|X - X_0\| \text{ s.t. } DHX = Y$$

5. Output: superresolution image $X^*$

It would be desirable to provide a method and apparatus to achieve real-time superresolution and video transmission that directly produces high resolution video on the decoder side from low quality low resolution video on the encoder side. In numerous computer vision applications, enhancing the quality and resolution of captured video is critical. Acquired video is often grainy and low quality due to motion, transmission bottlenecks, etc. Superresolution greatly decreases camera jitter to deliver a smooth, stabilized, high quality video. Superresolution has been used with video coding for many applications.

In this innovation, we integrate standard image/video processing techniques in unique form where we encode the global motion vectors and include it in the encoded low resolution video to transmit over the communication channels. On the decoder side, from the decoded video and motion vectors, we integrate motion registration, non-uniform interpolation, and image post-processing techniques to accomplish superresolution. We further enhance the superresolved video quality based on the state-of-the-art regularization technique where the image is iteratively modified by applying back-projection to get a sharp and undistorted image. Finally, the invention also relates to compressive sensing technique, which is utilized as the image filtering step. We directly use the interframe sparsity property among video frames in order to remove the requirement of having the trained dictionaries on the decoder side for each user. The results show the proposed technique gives high quality and high resolution videos and minimizes effects due to camera jerks. This technique has been ported to hardware for product development. We have shown the performance improvement of the hardware superresolution over the software version (c code).

BRIEF DESCRIPTION OF THE DRAWINGS

FIG. 21 illustrates exemplary resource utilization.

FIG. 22 illustrates performance of hardware and software implementations in Frames per Second.

DETAILED DESCRIPTION OF THE INVENTION

In the following detailed description, reference is made to certain embodiments. These embodiments are described with sufficient detail to enable those skilled in the art to practice them. It is to be understood that other embodiments may be employed and that various structural, logical, and electrical changes may be made.

H.264 Codec with Superresolution

Herein we utilize the user data Supplemental Enhancement Information (SEI) message field of H.264 coding standard to include the global motion vectors of the superresolution algorithm. This gives us the opportunity to apply the superresolution algorithm at the end of decoding as the motion information can be retrieved from the encoded stream. The user data unregistered SEI message syntax is as follows:

```
user_data_unregistered( payloadSize ) {
    uuid_iso_iec_11578
    for( i = 16; i < payloadSize; i++)
        user_data_payload_byte
}
```

Figure 1:
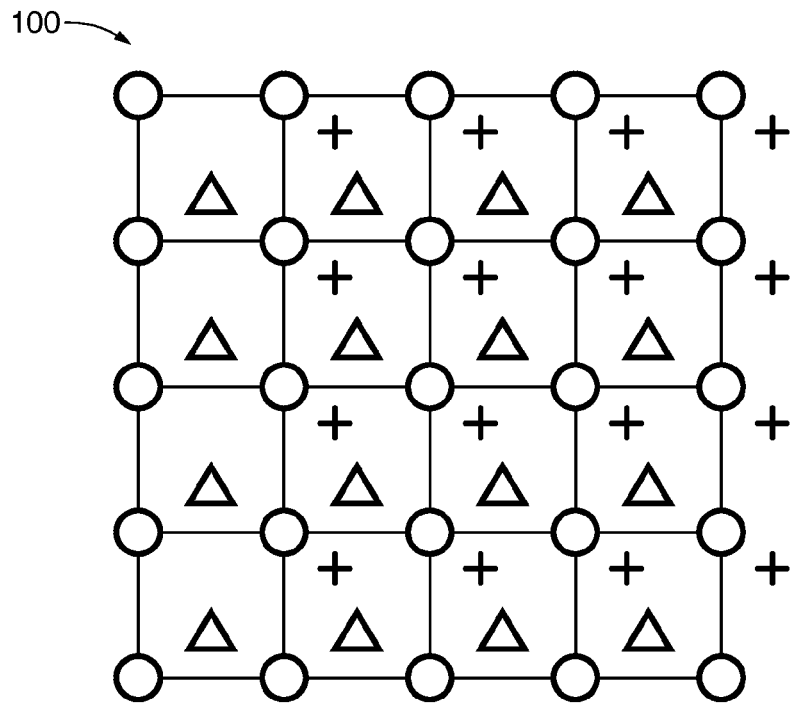
FIG. 1 illustrates an example of sub-pixel displacement.
Figure 2:
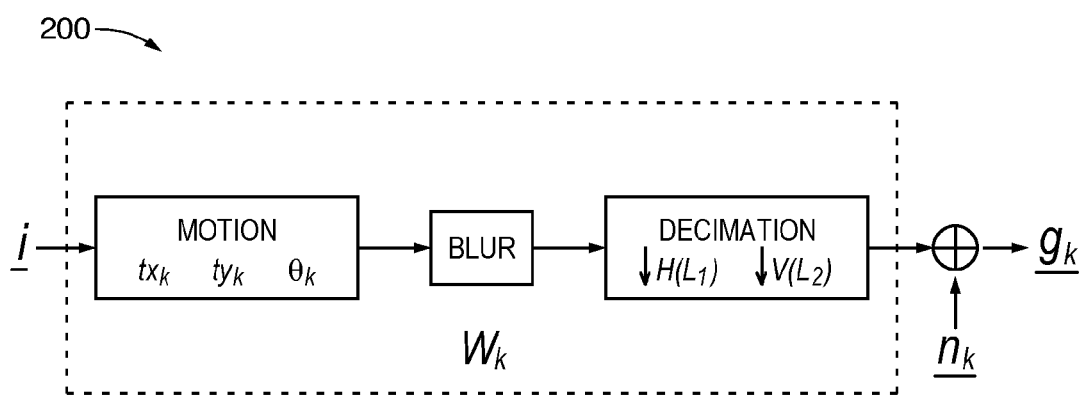
FIG. 2 illustrates a model generating LR images from the HR images.
Figure 3:
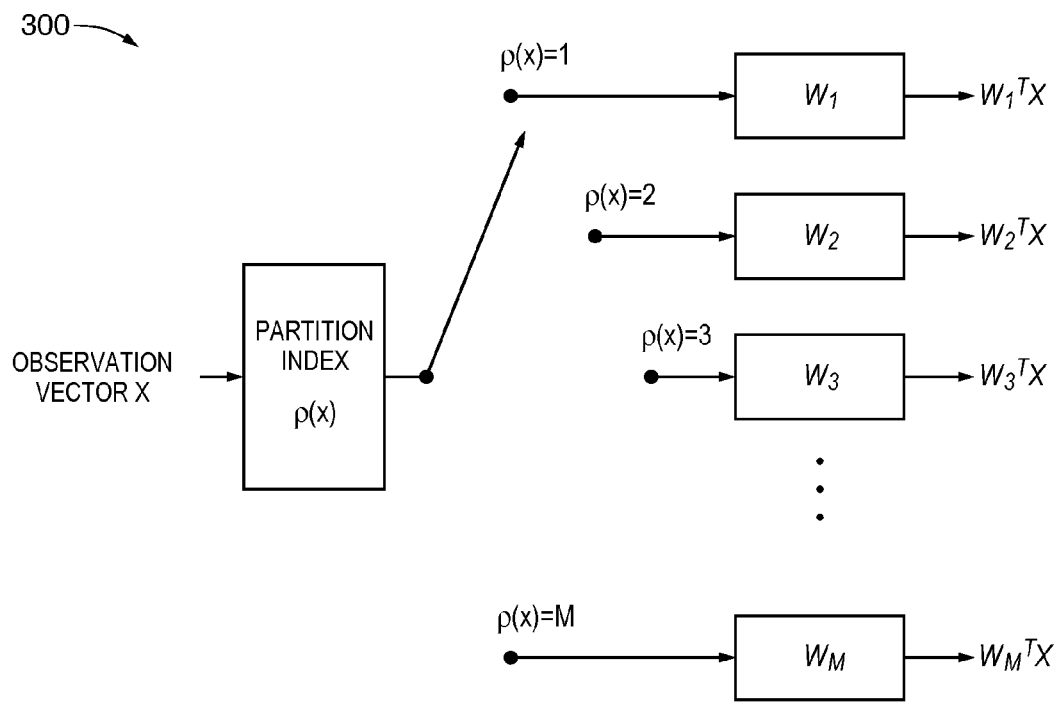
FIG. 3 illustrates a block diagram illustrating an exemplary prior art partition weighted sum filter.
Figure 4:
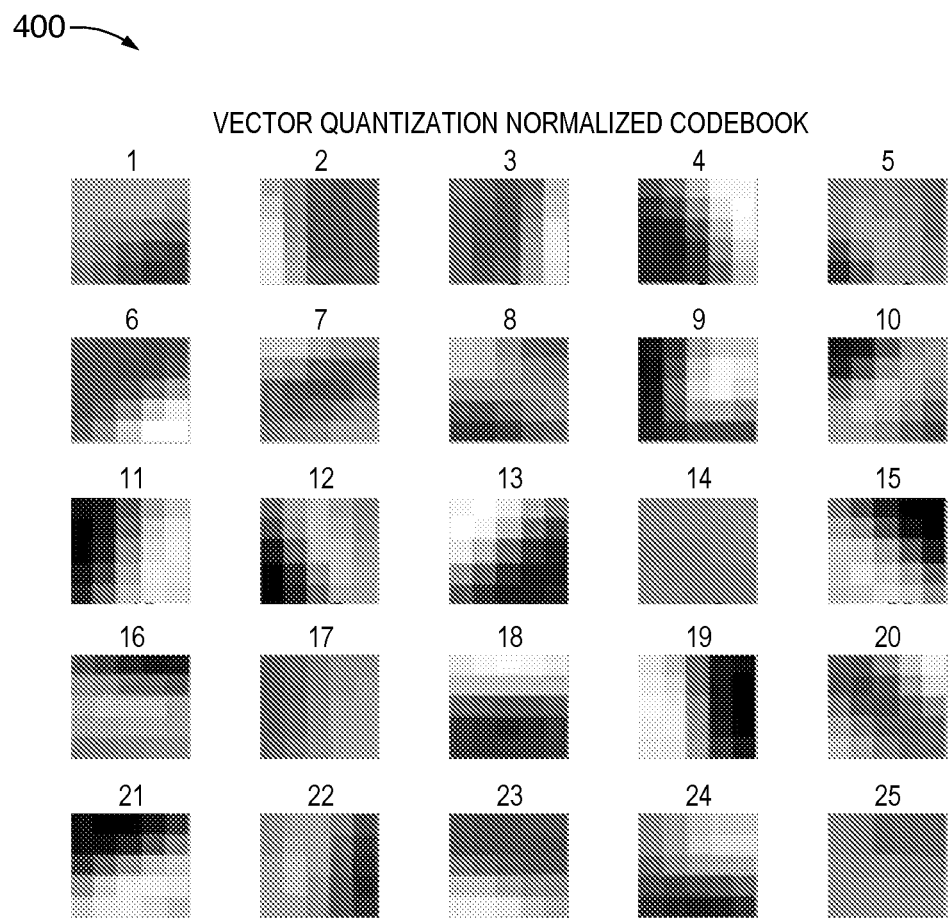
FIG. 4 is a vector quantization codebook for a prior art PWS filter.
Figures 5, 6:
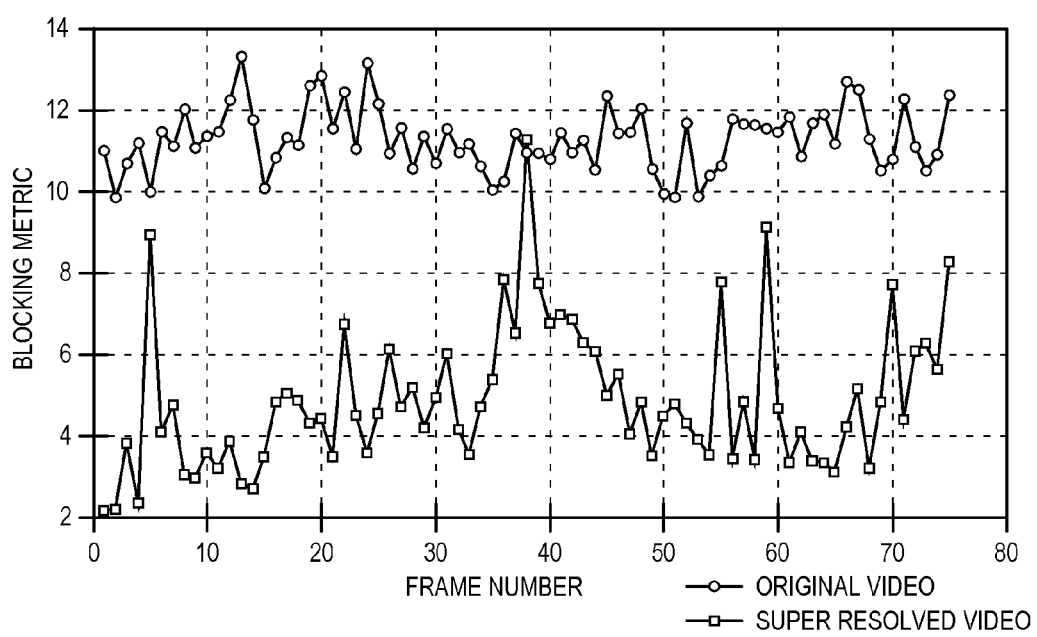
FIG. 5 illustrates a table showing a non uniform quantization arrangement.
FIG. 6 is an illustration of exemplary MSU blocking metric values for each frame.

The user data payload should be all integer values. The motion vectors, however, are computed using a gradient-based method and have floating point values. In order to store these floating point values in the user data payload field, we use non-uniform quantization. FIG. 5 shows how the quantized data is stored in the payload. FIG. 5 illustrates a table 500 showing a non uniform quantization arrangement for storing floating point motion vectors in the user data payload field. At the decoder, Payload 2 is first accessed and accordingly, the Payload 1 is divided by corresponding factors. This scheme allows having higher precision for smaller values of motion vectors while limiting the maximum length of payload to one byte.

Figure 7:
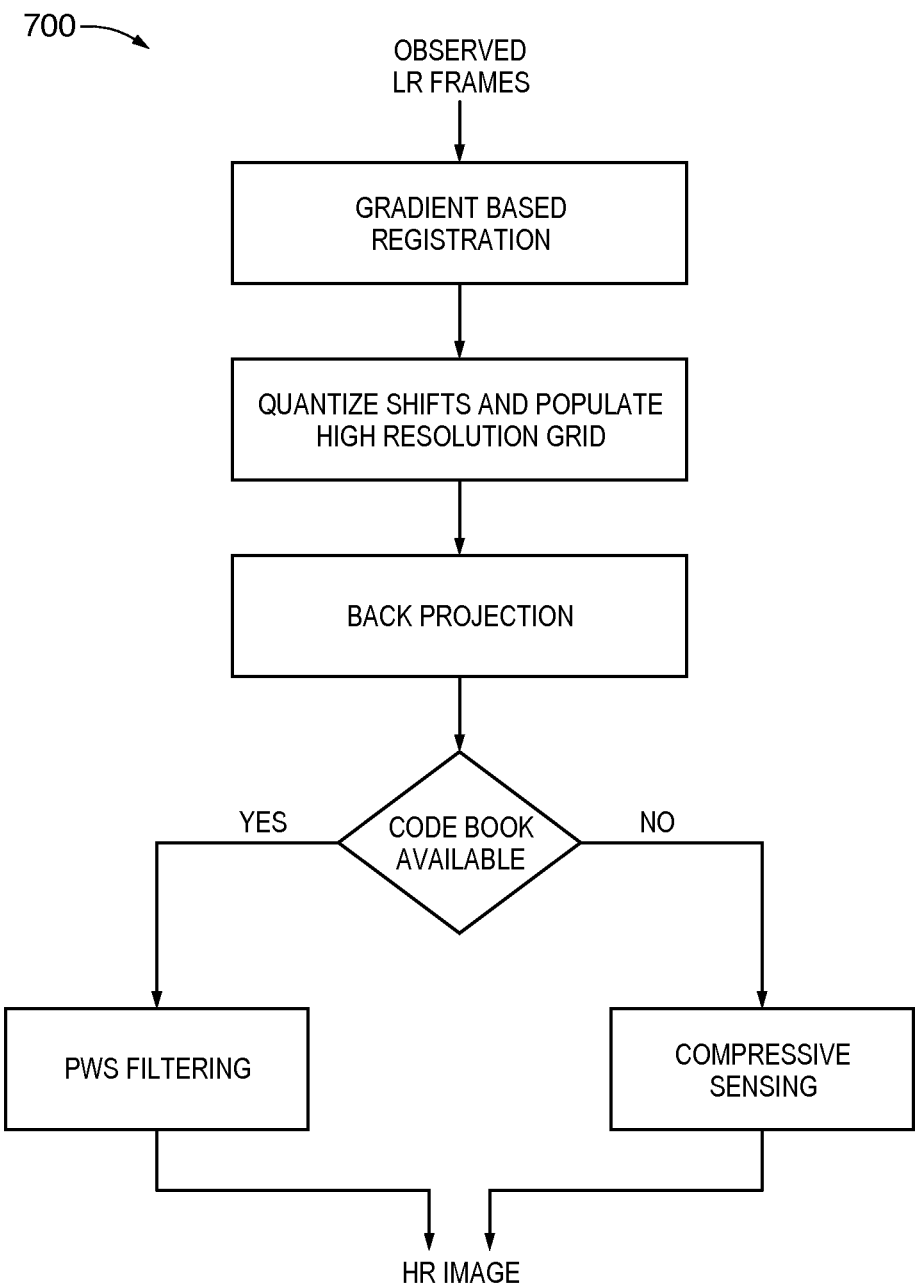
FIG. 7 illustrates a block diagram showing an exemplary implementation of superresolution.

We have applied superresolution on the decoded H.264 test video by using the recovered global motion vectors from the SEI message fields. The original VGA quality video (75 frames) is down-sampled to QVGA size and encoded in H.264 format along with the motion vectors. At the decoder side, we decode the H.264 video and superresolve it to get the VGA size video. We compute the MSU blocking measure on the VGA quality decoded and superresolved video and compare it with the original VGA quality video. As can be observed in FIG. 6, the average blocking measure on the original video is 11.27; whereas the average blocking measure on the superresolved video is 4.86. This large difference is because the superresolution algorithm stabilizes the video and removes any camera jerks. This in turn smoothes the image as it averages multiple low resolution frames to form one high resolution frame. FIG. 7 shows the block diagram illustrating the operations to implement the video superresolution at the decoder side. It contains the following subsystems.

Non-Uniform Interpolation for Superresolution

On the decoder side, after motion vectors are retrieved for each of the non-reference LR images, the LR images are placed on the HR grid using the weighted nearest neighbor algorithm described below.

1. Read in the vector containing the shifts calculated by the registration algorithm.
2. Determine each frame's position relative to the HR grid points.
3. Round each position to the nearest HR grid point.
4. Rank frames from closest to the farthest from the HR grid point.
5. Form weights for each of the 3 nearest LR images and sum them.
6. Sum the 3 nearest LR images and divide by the total weight For averaging the frames we could change the number from 3 to any reasonable number.

Let the populated high resolution grid be denoted by Z. In the next section, we will describe the application of back-projection technique in order to improve this image.

Figure 8:
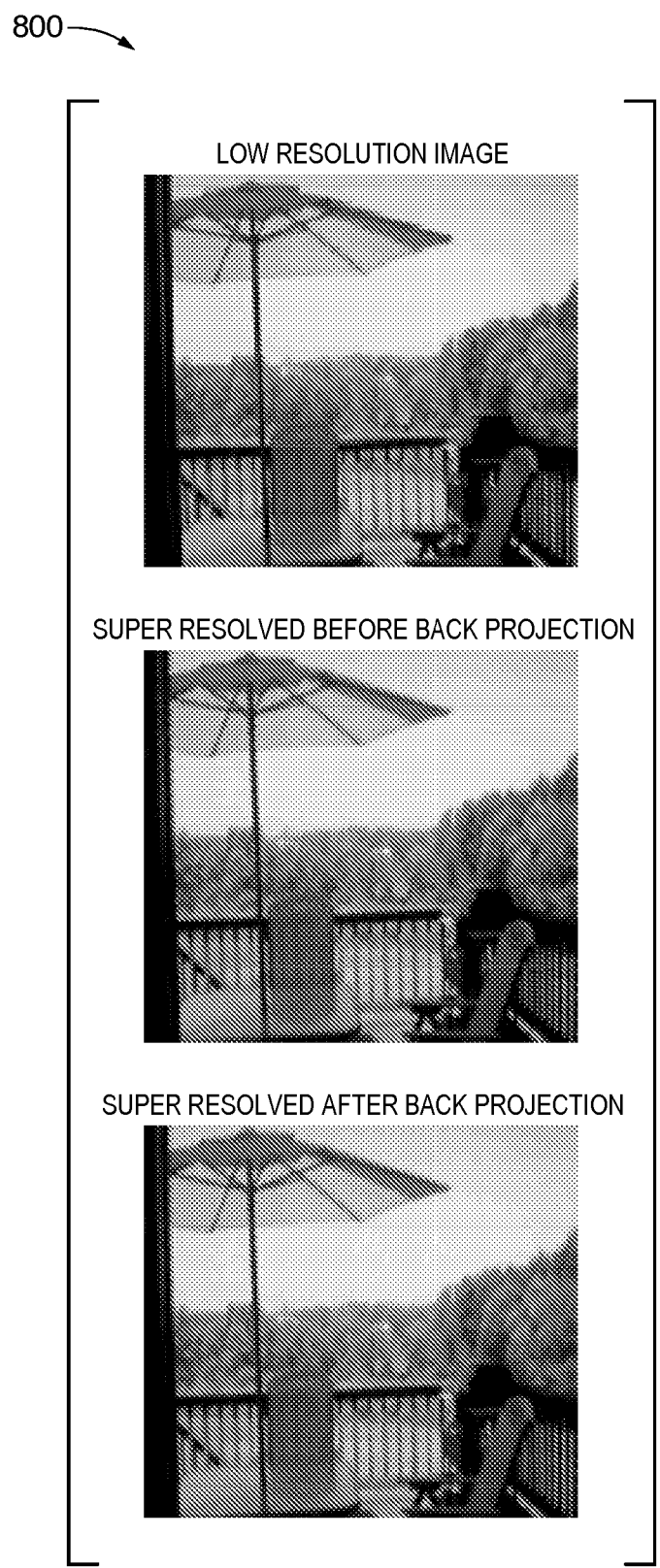
FIG. 8 illustrates a superresolution result before and after back-projection.
Figure 9A:
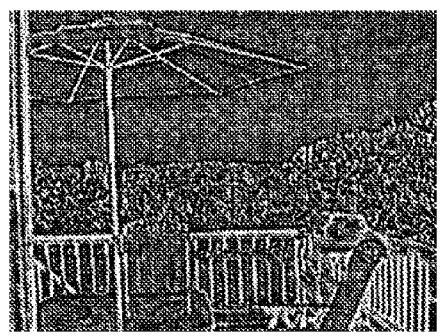
FIGS. 9A-D show images corresponding to back projection term of equation (7).
Figure 9B:
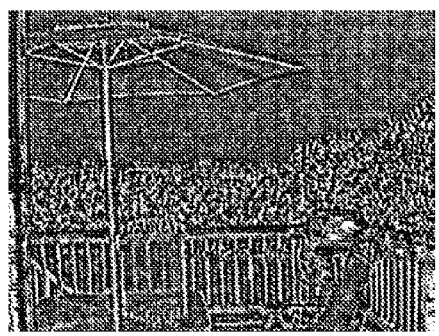
Figure 9C:
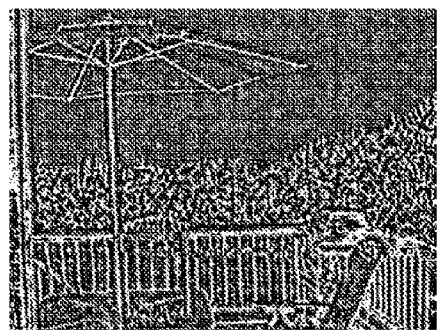
Figure 9D:
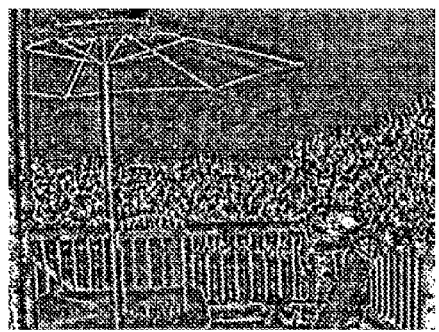
Figure 10A:
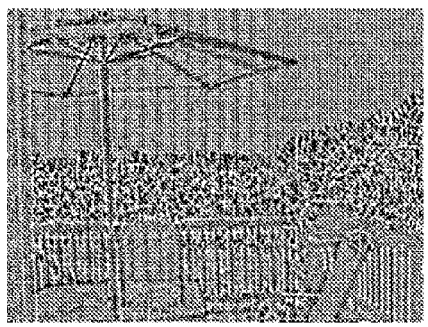
FIGS. 10A-D are images corresponding to regularization term of equation (7).
Figure 10B:
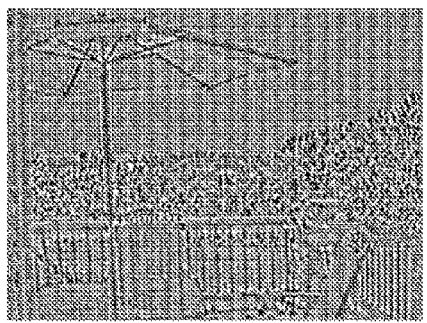
Figure 10C:
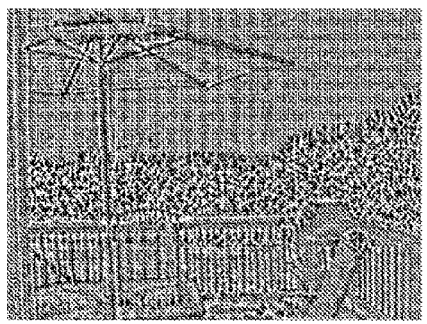
Figure 10D:
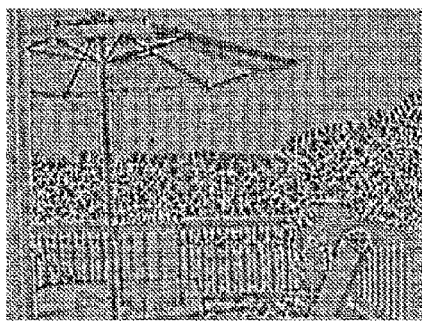

We enhance the high resolution grid obtained in the previous step by applying a regularization technique (back-projection algorithm). A main difference between prior art techniques and our method is that we use nearest neighbor based fusion of low resolution frames instead of the median operation used in the prior art to fuse the low resolution frames. Experimental results show that this modification enhances the quality of the superresolved video. FIG. 8 shows a low resolution frame and superresolved high resolution frames before and after applying back-projection. The improvement by back-projection algorithm is not very apparent in FIG. 8 as the display does not show their actual size (640×480). In order to analyze the effect of the back-projection algorithm, we have computed some metrics that will help understand its advantages qualitatively. The qualitative measure of the back-projection algorithm is computed using MSU quality measurement tool. MSU blurring metric is computed on the images before and after back-projection. This metric allows you to compare the power of blurring of two images. If the value of the metric for the first image is greater than for the second it means that the second image is more blurred than the first one [20] and vice-versa. The total number of superresolved frames in our video is 75. We have used 16 low resolution frames to compute each high resolution image. In this case, we also have the original high resolution frames in order to compare the blurring measure.

The average blurring measure over all the original high resolution frames was 14.62. The average blurring measure for the superresolved high resolution frames before applying back-projection was 10.73 and for the same after applying back-projection was 11.06. This indicates that the back-projection algorithm does decrease the blur or increase the sharpness of the superresolved image. Along with the blurring measure, we also computed mean square error (MSE) and gradient modular square sum (GMSS) between the original high resolution image and the superresolved images before and after back-projection. We obtained average MSEs before and after back-projection over all the frames to be 841.03 and 834.68 respectively. The average GMSS before and after back-projection were 181.5 and 176.29 respectively. These results clearly indicate that application of back-projection on the superresolved images improves the quality and results in a closer match to the corresponding original high resolution images.

Next, we visualize the effect of back-projection by observing the update equation of the algorithm. FIGS. 9A-D and 10A-D show images corresponding to the two terms in equation (8)—back-projection term and regularization term. This indicates that the back-projection algorithm enhances the edges of the superresolved image. This in turn will increase the sharpness of the image. FIGS. 9A-D are images corresponding to back projection term of equation (7). 9(a)-(d) are images of iterations 1 to 4. FIG. 10A-D are images corresponding to regularization term of equation (7). 10(a)-(d) are images of iterations 1 to 4.

Partition Weighted Sum (PWS) Filtering

Figure 11:
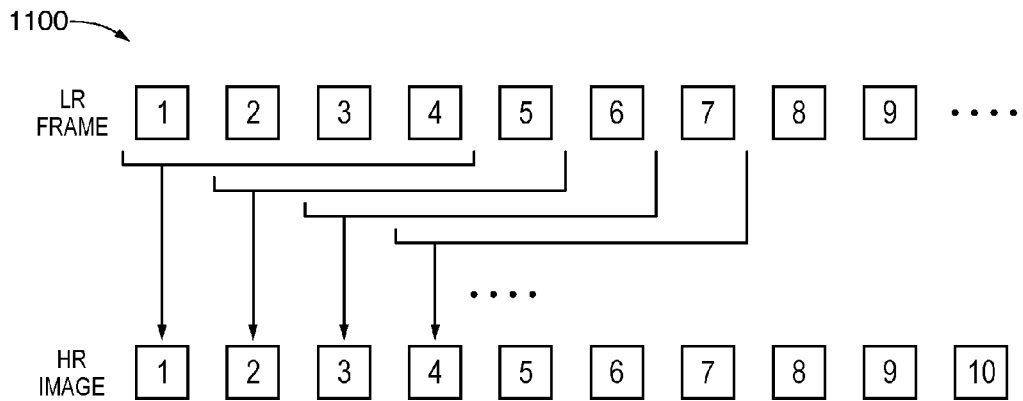
FIG. 11 illustrates a moving window of LR frames.

The LR frames are registered using a gradient based technique. We assume translation and rotational motion. The estimated shifts are rounded and the samples from LR frames are inserted into the nearest pixel position in the HR grid. We consider a moving window. Within this window two factors have to be determined, the first is the configuration of missing and present pixels which is referred to as population index; the second is the underlying structure for the present pixels. The population index specifies the indices of the pixels present in the window. Finally a filter tuned to the specific configuration and partition is applied to the observation vector. FIG. 11 shows a Moving Window 1100 of LR frames.

The new implementation of PWS filters can be easily extended for video processing by using a moving window of LR frames. Consider A sequence of LR frames that we use 4 frames to construct one HR image. The first 4 frames are registered. The registration is carried out such that each frame is registered to the previous frame. The FIR grid is formed such that its center is positioned at the average of the computed shifts. The PWS filters are then used to obtain the HR image. For the second HR image the window is moved by one frame. Frame 1 is removed and the new incoming frame 5 is registered to Frame 4. We have to do only one registration for each frame.

Figure 12:
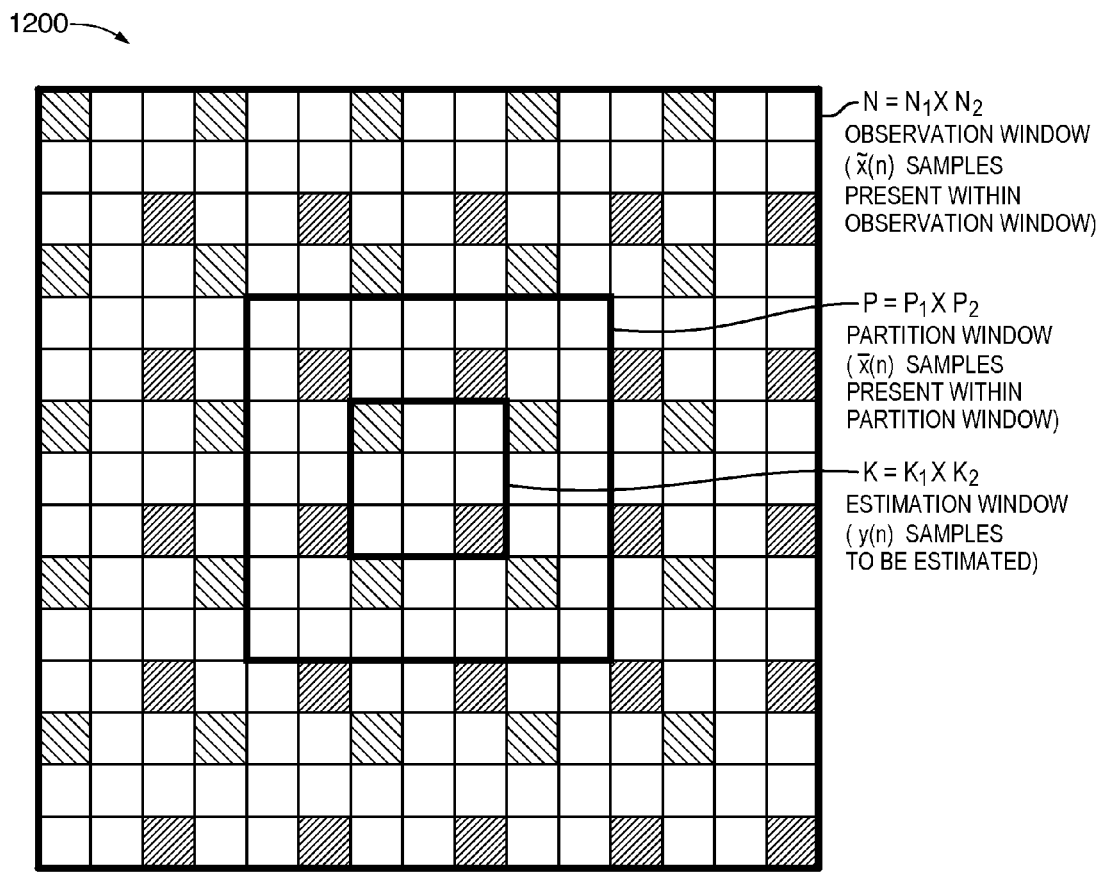
FIG. 12 illustrates a PWS based superresolution of a $N_1 \times N_2$ observation window.
Figure 13:
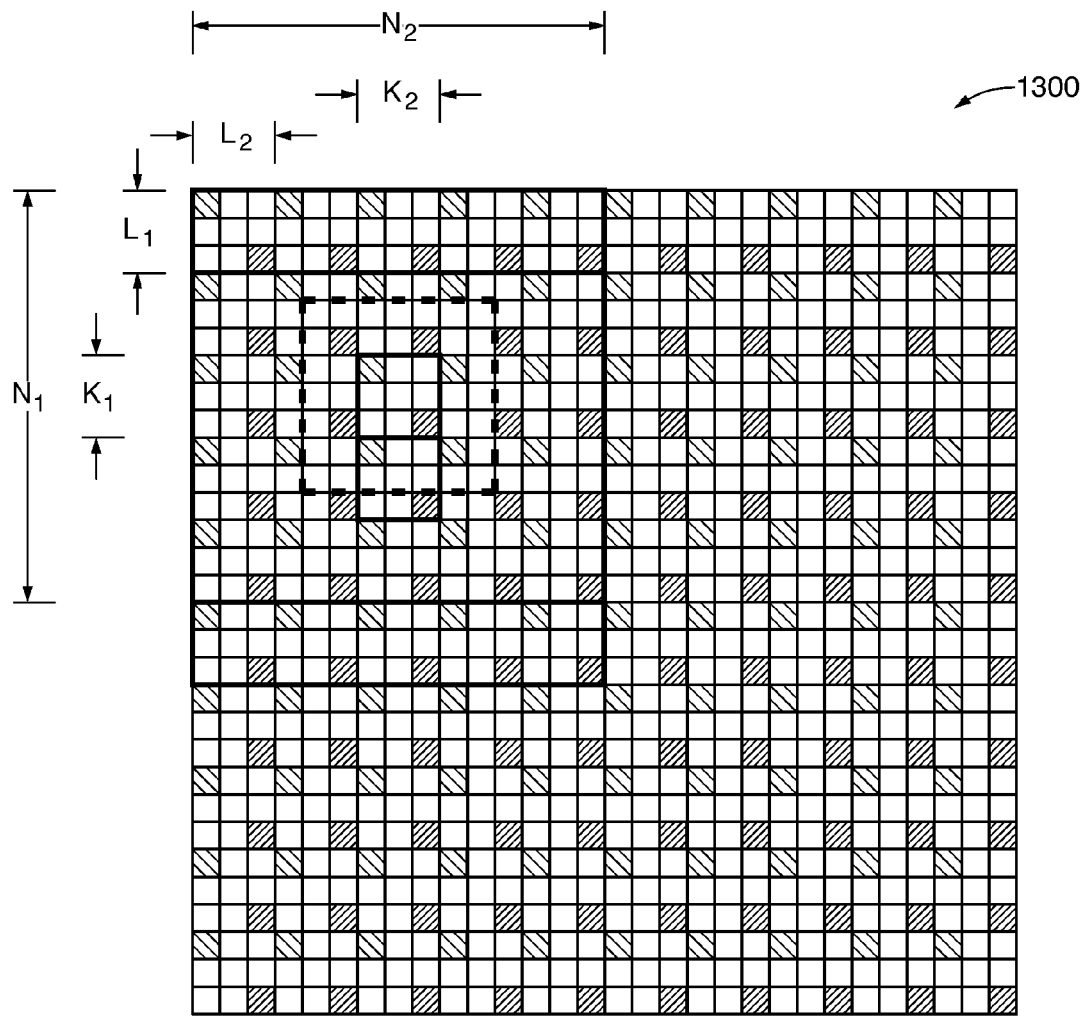
FIG. 13 illustrates a population of a HR grid.

FIG. 12 is an exemplary PWS based superresolution of a $N_1 \times N_2$ observation window. Here is an $N_1$ by $N_2$ observation window, wherein the samples present in the window are denoted as N. The samples present in the partition window at the center of the observation window are used for partitioning. The samples in the observation could be used but this leads to increased computational complexity. Moreover there is no significant difference in performance by considering pixels in the small partition window because the dominant values of the impulse response are concentrated at the center of the window. The goal is to estimate the pixels in the estimation window.

Let us assume there is translation motion between frames. We form the partially populated HR grid and consider the region where the LR frames spatially overlap. Consider the case of multiple partitions M>1, we use an observation window partition window and estimation. The size of the window is chosen to be the upsampling factor. Suppose we move the window by $k_1$ and $k_2$ the configuration remains the same for two window but the structural information changes. Once the configuration index is determined the weights are precomputed for all the partitions. Then the window is moved and the partition is determined and corresponding weights are applied. For m=1 the partitioning is not explicitly performed, and hence the weights remain the same for every window. For rotation the regularity is not preserved and weights are computed on the fly.

Superresolution Using Compressive Sensing

If the code book is not available for PWS filtering, an alternative choice to further refine the superresolved video is using the recently emerging compressive sensing technique. Since we already obtained the superresolved image for each video frame, it turns to a problem of recovering the super-resolution version of a single given low-resolution image. For such a problem, working directly with the low-resolution training patches or their features is possible, thus learning on the high-resolution patches is not necessarily needed.

Figure 14:
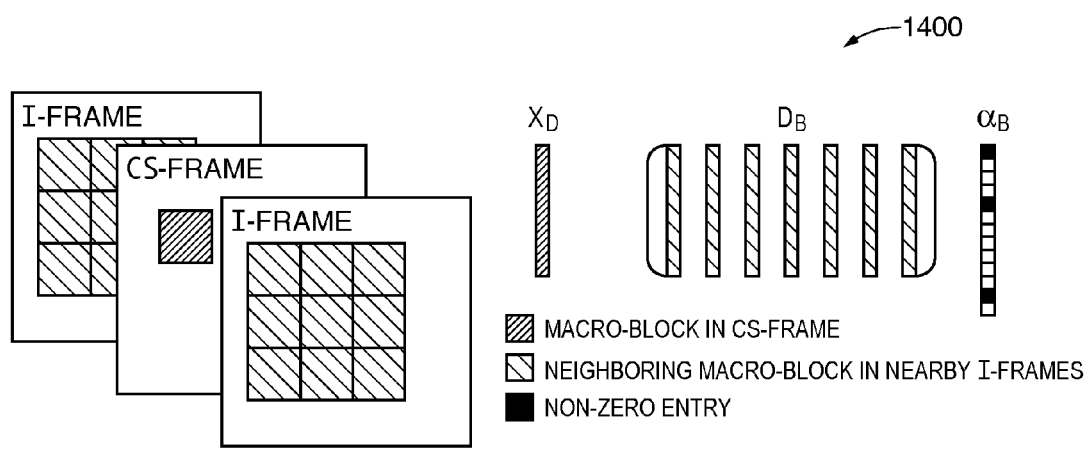
FIG. 14 is an exemplary Interframe Sparsity Model.

In order to use compressive sensing (CS) technique for single image superresolution, trained dictionaries $D_l$ and $D_h$ have to be available in the decoder side. However, it is not practical or is too expensive to have such information for each user in the decoder side. Therefore, we propose to use the interframe sparsity property among video frames in order to remove the requirement of having the trained $D_l$ and $D_h$. With a video sequence, there are a lot of temporal correlation among subsequent images/frames. This temporal correlation among frames can be exploited to yield a large improvement of reconstruction quality. The core principle of this property, which is illustrated in FIG. 14, assumes that a (vectorized) block in a CS-frame can be sparsely represented as a linear combination of (vectorized) temporal neighboring blocks. Then the improved reconstruction of the superresolved video at the decoder side is obtained using a conventional method that does not exploit the source of side information. If high resolution videos are available at the encoder side, we only need to transmit the I frames through the communication channel; and at the decoder side, the CS-frames can be reliably reconstructed using these high resolution I frames, without having any trained dictionaries $D_l$ and $D_h$. FIG. 14 illustrates an example of The Interframe Sparsity Model which assumes a (vectorized) block in a CS-frame can be sparsely represented as a linear combination of (vectorized) temporal neighboring blocks in preceding and following key frames.

Implementation

Simulink

Figure 15:
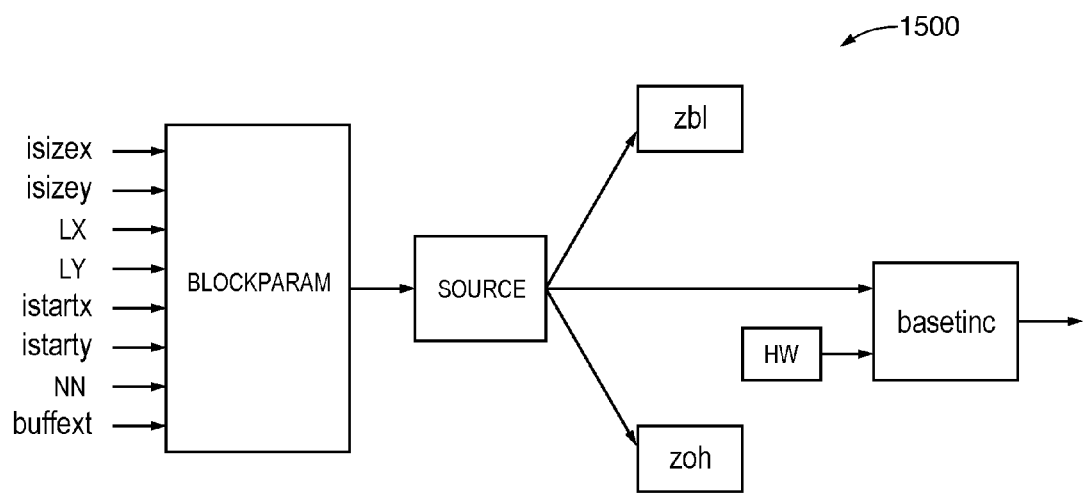
FIG. 15 is a schematic of the major blocks in the Simulink fixed point implementation.

In this section we will briefly describe the implementation in the Simulink fixed point and discuss the issues in the implementation procedure. The model was first implemented in Matlab and the performance was imitated by implementing in the Simulink floating point mode. Later, the model was converted to Simulink fixed point so that the fixed point model can be converted to a VHDL model which is later ported onto a FPGA board. The rough schematic of the implementation in the fixed point mode is show in FIG. 15.

We describe the blocks in the above schematic in the following paragraphs.

The blockparam block loads the necessary variables (that the user can modify accordingly) onto the Simulink workspace. This block has to be run prior to running the fixed point model (or the floating point model) so that these models can use the values of the variables as set by the user. The user can modify the values of the following parameters in the blockparam block:

Initial Size of low-resolution image to be enlarged ("isizex" & "isizey")—note that the program requires both the width and the height to be values that are a power of 2.

Factor by which to enlarge low-resolution image ("LX" and "LY")—again these have to be powers of 2.

Number of nearest neighbors ("NN")—these are the number of neighbors to use in the non-uniform interpolation portion in the basetinc block.

The buffer provided to the input image ("buffext")—this variable allows the user to vary the buffer provided to the input image so that the effect of huge registration values can be minimized.

The coordinates of the image starting from where the input image will be cropped ("istartx", "istarty")—these variables allow the user to mention the coordinates (either left-top or left-bottom) starting from where we can crop the input image.

The blockparam block generates more variables which are passed onto the other blocks. This has not been shown to keep the schematic simple.

Source: The source block buffers "group" (LX×LY) number of frames and outputs them. It also outputs the registered values between successive frames summed till the present frame. The outputs are in "yobs" and "spre" signals respectively. The Schaumit block within the Source block computes the registration between two consecutive frames.

Transwnavg: The important functions of the algorithm are implemented in this block in the form of sort and filling blocks. The sort block calculates the index, error distance, sorts them and then inverts these distance. The filling block uses the "NN" most important frames for each pixel position to fill the image. For each pixel the frames are shifted (performed by circshift3 block) by the corresponding registration value and averaged accordingly. This block is nested in the basetinc block.

HW: This block generates Wiener filter frequency response which will be used for post processing the output of the algorithm.

The basetinc block performs the function of post processing the image obtained after reconstruction in the Transwnavg block. The Wiener filtering block within this block applies the wiener filter frequency response obtained from HW block.

Zbl: This block performs interpolation (bilinear) after scaling the original image by "LX" and "LY" times in the x and y direction respectively.

Zoh: This block performs a simple pixel replication or ZOH operation, thus increasing the size of the image by "LX" and "LY" times.

The fixed point Simulink blocks were built after building and testing the floating point blocks. The model functions in an exactly similar way as the floating point blocks with some minor changes. The word lengths and the slope in the blocks have been fixed by looking at the raw data at each of the nodes in the floating point model. For e.g. if the value of some variable is $\frac{1}{6}$ then the data type associated with this is sfix16_En15. The word length itself was decided first keeping the accuracy of the variables in mind. For e.g. the registered values stored in "spre" variable has been described using data type sfix32_En23.

The performance of the floating point model is exactly the same as the Matlab code and also as fast. With regards to speed and processing time it has been observed from the Simulink Profiler Report that self time percentage is highest for the IFFT and the FFT blocks which are placed in the post-processing block of Wiener filtering. This shows that the main algorithm is by itself quite fast but the post-processing is making it little slower. An improvement in the speed of the IIFT and the FFT blocks will significantly increase the speed of the overall algorithm.

In the fixed point model, there is some drop in performance if we look at the registered values. Some of the registered values in the fixed point model tend to have an error of around 5-10% compared to the floating point model. This error is expected since using data type of fixed length in various stages of calculating the registered values decreases the accuracy of the obtained values. Since the registration values play an important role in the algorithm, a corresponding decrease in performance is seen in the output of the algorithm. The performance was tested by assigning greater word lengths but the error in the registered values didn't show much improvement. The word lengths of the variables were fixed such that the performance was not affected and the number of bits was less than 32. Also, as in the floating point model the IFFT and the FFT blocks had the highest self time percentage.

The algorithm is significantly slower compared to the floating point model. To some extent this is expected on a computer running software like Simulink which checks all the flags while performing fixed point operations. The simulation was performed without the post processing stage of Wiener filtering (where the IFFT and FFT blocks reside) and the performance was significantly faster, almost as fast as the floating point model. The real performance of the algorithm can be gauged only on the hardware where simplicity in implementation, reduction in hardware real estate and the speed of the fixed point model can be truly observed. The performance of the fixed point algorithm can be seen in FIG. 15, where the original image (Zoh) along with the images from the Zbl and Basetinc blocks with and without the Wiener filtering is shown.

After the HR image reconstruction the blur in the image is removed by using the standard Wiener filtering. In the next section we describe the implementation of this algorithm in Simulink fixed point. In the later section we describe how the algorithm was implemented on a FPGA board.

FPGA Implementation

The process of implementation of superresolution in hardware is split into the following steps:
1) Deriving the project specification. 2) Block identification. 3) HDL coding and debugging the individual blocks. 4) Integration and top level testing. 5) Synthesis and porting to FPGA.

Design Specifications

Detailed documentation of the superresolution algorithm with the fixed-point reference software implementations in Matlab and Simulink were used as guidelines. Requirement of achieving real time (30 FPS) superresolution of 320×240 video sequence to 1280×960 (16×) on a FPGA was set as target.

Figure 16A:
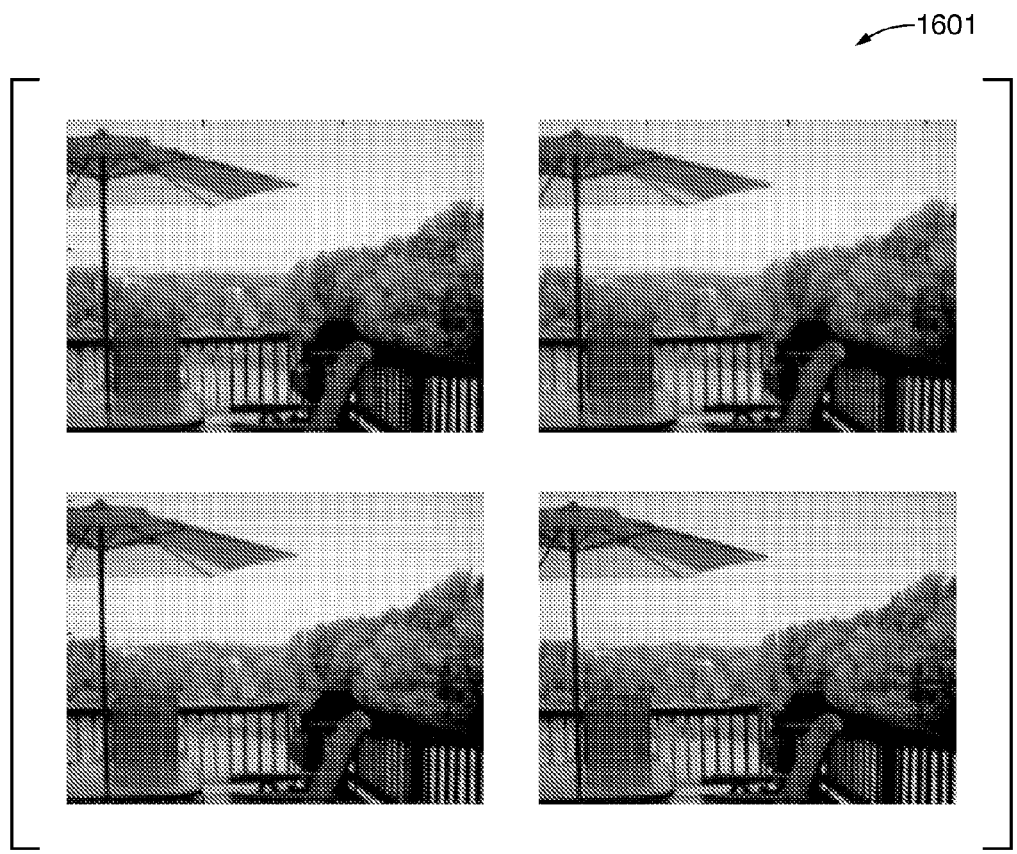
FIGS. 16A-B illustrate exemplary superresolution outputs.
Figure 16B:
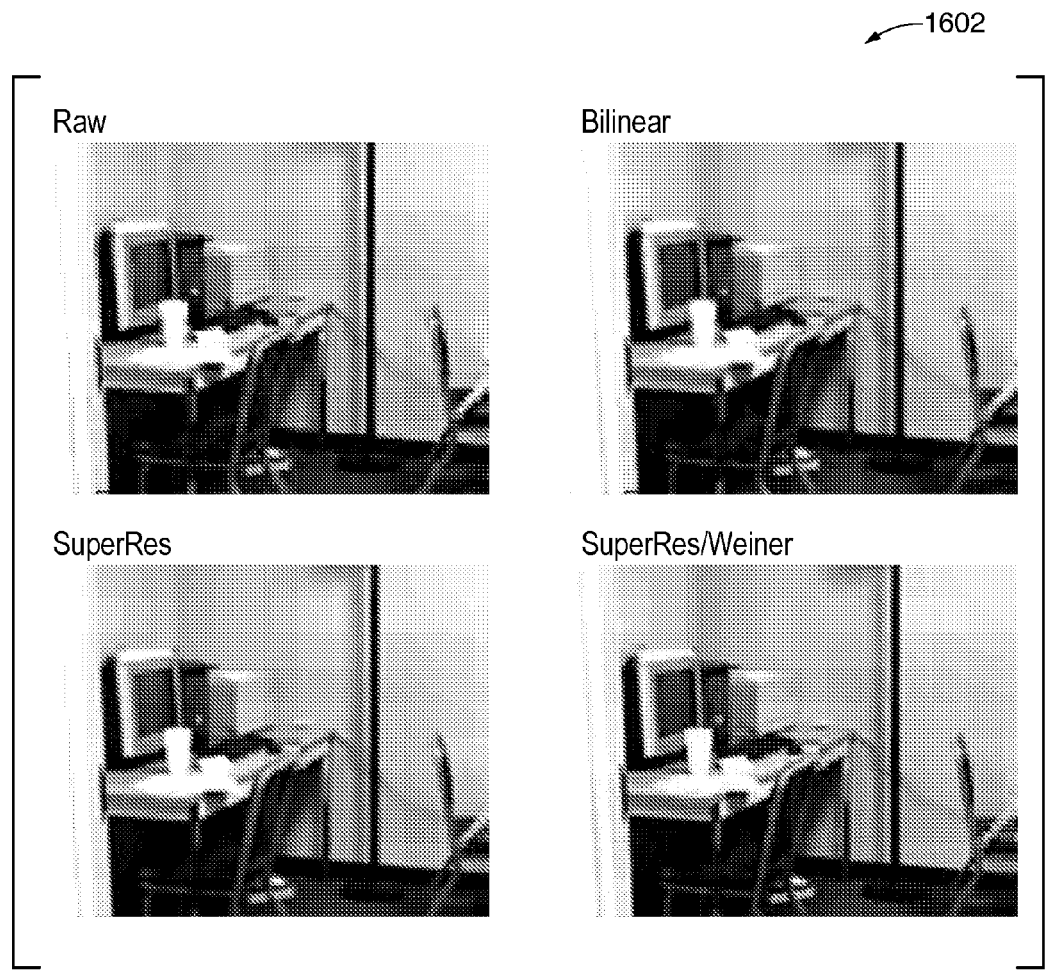

FIGS. 16A and B illustrate an exemplary superresolution output. In FIG. 16A, which shows an outdoor table, the images are as follows: Left top: original image, Right top: bilinear interpolated image, Left bottom: superresolved image without Weiner filter, Right bottom: superresolved image with Weiner filter. FIG. 16B illustrates Indoor table with the same types of images in each quadrant of the figure.

Functional Modules and Hardware Blocks

Figure 17:
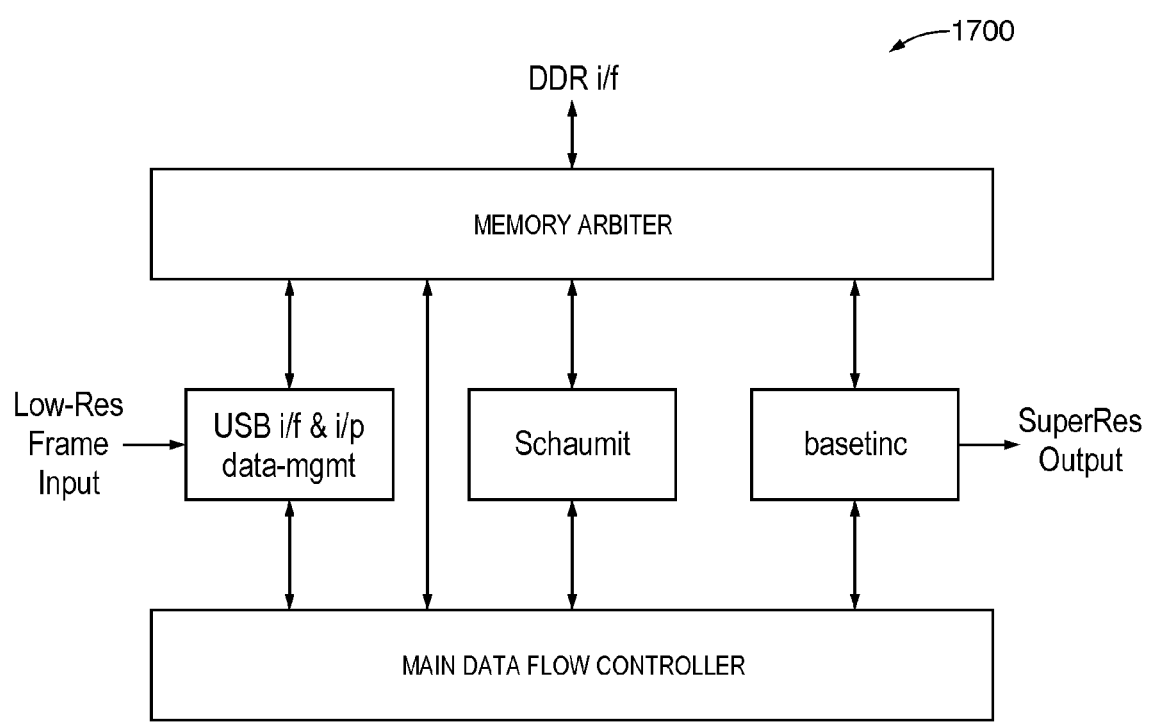
FIG. 17 illustrates a simple block diagram of hardware implementation.

A superresolution algorithm was modularized into blocks suitable for hardware implementation. Algorithm functionality was modularized to improve hardware resource utilization and minimize data exchange with external memory. Memory interaction was limited to reading low-res frames. Image registration for global motion was performed iteratively for the first frame and differential data was stored to minimize data exchange for successive frames. A pipelined architecture with double buffering was developed to minimize stalls in data flow. Generic memory modules and FIFOs were used for internal data storage to help porting on FPGA. A simple block diagram of hardware implementation is shown in FIG. 17.

HDL Coding and Verification

Individual modules were coded in VHDL and verified for functionality. A mixed hardware-software verification technique was developed. Fixed point implementation in matlab and simulink were used as reference and data output at each stage was tapped for verification. Test benches were developed to automate verification of data generated by hardware blocks against the simulink data and bit-exactness was verified. Fixed point implementation helped to verify hardware implementation without any error tolerance. Bit-depths per pixel used in simulink modeling were maintained in hardware implementation to achieve precise results. This module level hardware-software co-verification accelerated coding and verification process and removed errors in the design.

Integration and Functional Simulations

Figure 18:
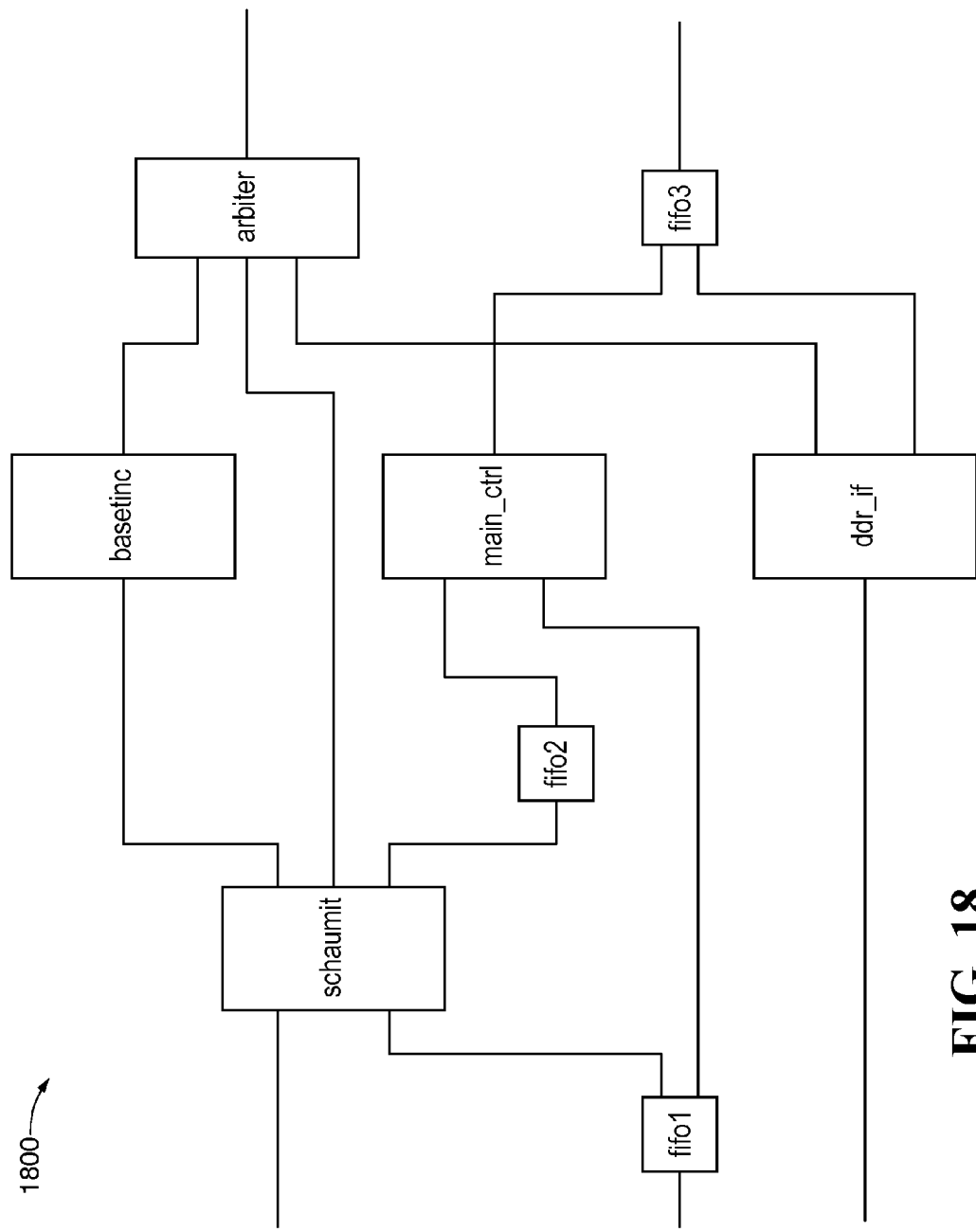
FIG. 18 illustrates a simplified representation of a Simvision generated schematic of the hardware implementation.

Individual blocks communicated data and control signals with the neighboring blocks through memory blocks and FIFOs. The main data flow controller monitored the overall data flow. The functional blocks were designed to utilize optimized number of clocks to generate the intermediate results for the next stage. FIFOs and double-buffer memory blocks were used for data transfer between modules in the pipelined architecture. This enhanced data flow and reduced stalls in the pipeline. All modules were integrated and system level hardware-software co-verification was performed. FIG. 18 shows a simplified representation of the Simvision generated schematic of the hardware implementation. Pixels of superresolved frames from Simulink and VHDL implementation were cross verified for bit-exactness on various sequences.

Figure 19A:
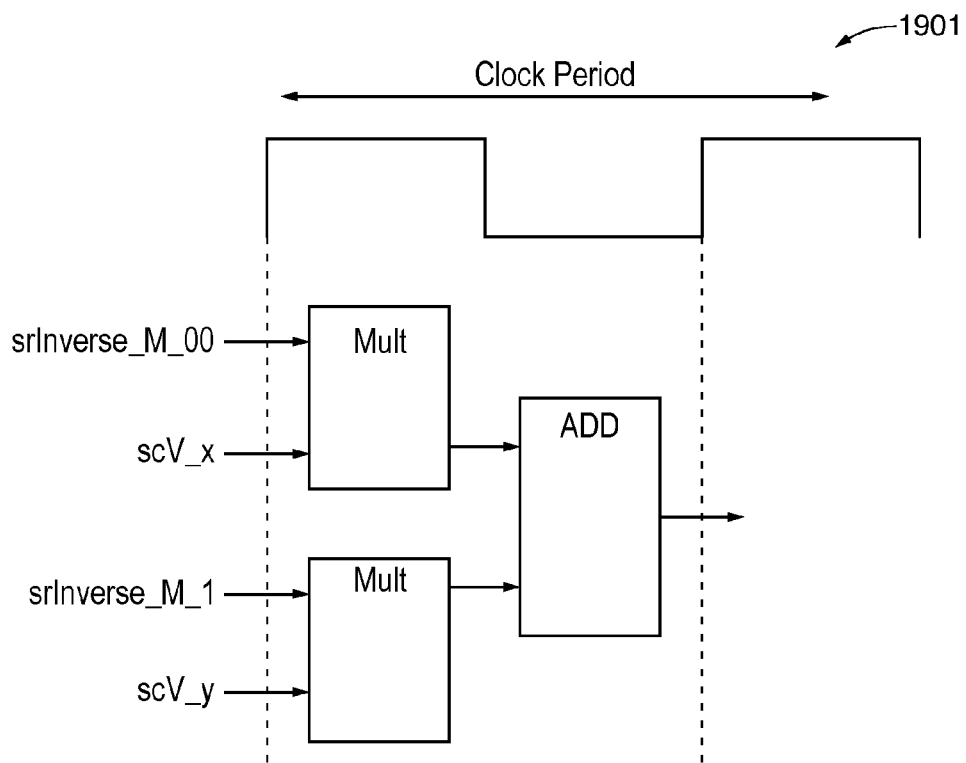
FIG. 19A illustrates a critical path that constrained the frequency of operation.
Figure 19B:
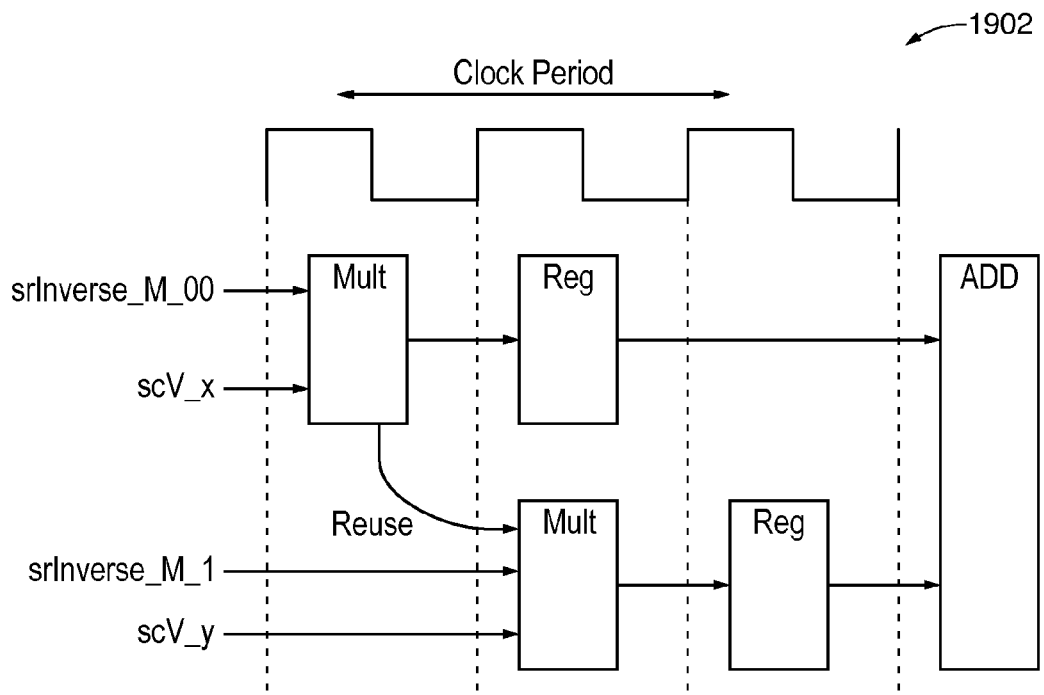
FIG. 19B illustrates a critical path split into multiple clock design.

FIG. 19A illustrates a critical path that constrained the frequency of operation to 30 MHz. FIG. 19B illustrates a critical path split into multiple clock design to improve resource utilization and to improve frequency of operation to 48 MHz.

Synthesis and Porting to FPGA

Verified VHDL design was prototyped on the Xilinx Virtex 4 FPGA. The design was modified to use standard Xilinx components for memory blocks, FIFO and clock generators. Design was synthesized for the Virtex 4 FPGA with Synplicity and Xilinx ISE tools. VHDL implementation required further optimizations to meet the 30 FPS requirement. Many critical paths with bigger combinational cloud prevented the design to run at higher frequencies. These critical paths were broken where possible and additional states were introduced at other places. FIG. 19A shows the critical path that constrained the frequency of operation to 30 MHz. FIG. 19B shows the optimized logic that not only helped to improve the overall core frequency to 48 MHz but also improved resource utilization by reusing the math blocks.

Figure 20:
FIG. 20 illustrates a result of the hardware-implemented real-time superresolution technique.

Additional modules to get input low-res video and to render superresolved frames to the screen were developed. Design was modified to use multiple clocks for memory controller, display controller and the superresolution core. The FPGA bit file was generated for Xilinx Virtex 4 FPGA on OTS prototype board by Dini group. FIG. 20 is the picture showing the result of the hardware-implemented real-time superresolution technique.

Hardware Performance

Hardware implementation was ported on Xilinx Virtex 4 LX200 FPGA. FIG. 21 shows the resource utilization of the superresolution algorithm on LX200 FPGA. Superresolution core was loaded on to the FPGA board and was run at 32 MHz on the Xilinx Viirtex 4 FPGA. Hardware implementation was tested for performance with variety of streams of different input resolution. Same streams were also run through an Optimized C code implementation of the algorithm and were run on a AMD64, 3 GHz systems. FIG. 22 shows a table 2200 listing the performance of hardware and software implementations in Frames per Second (FPS) for different input resolutions.

Figure 23:
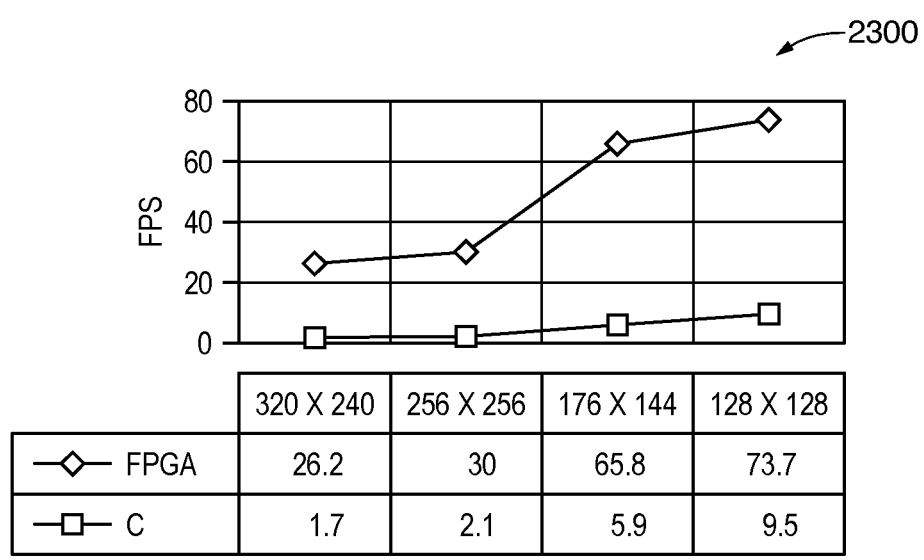
FIG. 23 is a plot of performance of hardware and software implementations in Frames per Second (FPS) for different input resolution.

FIG. 23 illustrates a plot of performance of hardware and software implementations in Frames per Second (FPS) for different input resolution The above description and drawings are only to be considered illustrative of specific embodiments, which achieve the features and advantages described herein. Modifications and substitutions to specific process conditions can be made. Accordingly, the embodiments of the invention are not considered as being limited by the foregoing description and drawings.

The invention claimed is:

1. A method of performing real-time video superresolution, comprising:
   receiving at a decoder a data stream representing a low resolution video and global motion vectors relating to image motion between frames of the low resolution video;
   using the global motion vectors and advanced multiframe processing to non-linearly derive a high resolution video from the low resolution video based only on characteristics of the received data stream consisting of the low resolution video and the global motion vectors relating to image motion between frames of the low resolution video; and
   increasing the sharpness of the high resolution video using a partition weighted sum (PWS) filter.

2. The method of claim 1, wherein the low resolution video is a downsampled version of a higher resolution original video.

3. The method of claim 2, wherein the low resolution video and global motion vectors are encoded using a video coding standard selected from the group comprising MPEG-1, MPEG-2, MPEG-4; H.263, H.264 and the formative H.265.

4. The method of claim 3, wherein the global motion vectors are encoded in the data stream, either as auxiliary data in a stream wrapper such as an MPEG-2 transport stream or within the video bit stream such as in a supplemental enhancement information message field of the H.264 standard.

5. The method of claim 4, wherein the global motion vectors are encoded in the supplemental enhancement information message field using non-uniform quantization.

6. The method of claim 1, wherein each frame of the high resolution video is derived from a plurality of frames of the low resolution video and the global motion vectors.

7. The method of claim 6, wherein the plurality of low resolution frames is at least three.

8. The method of claim 6, wherein the derivation of the high resolution video uses compressive sensing (CS).

9. The method of claim 8, wherein the compressive sensing does not require the decoder to store trained dictionaries.

10. The method of claim 8, wherein the compressive sensing is used to represent a vectorized block of pixels in a given frame as a linear combination of vectorized blocks of pixels from frames that are temporally proximate to the given frame.

11. The method of claim 1, wherein the sharpness of the high resolution video is increased by iteratively applying a back-projection algorithm.

12. The method of claim 11, wherein the applied back-projection algorithm uses nearest neighbor based fusion of low resolution frames.

13. The method of claim 1 wherein the video superresolution processing is achieved in real-time via hardware components including field programmable gate arrays (FPGAs).

14. A system of performing real-time video superresolution, comprising:
    a decoder configured to receive a data stream representing a low resolution video and global motion vectors relating to image motion between frames of the low resolution video and to use the global motion vectors to non-linearly derive a high resolution video from the low resolution video based only on characteristics of the received data stream consisting of the low resolution video and the global motion vectors relating to image motion between frames of the low resolution video and using a partition weighted sum (PWS) filter.

15. The system of claim 14, wherein the received low resolution video is a downsampled version of a higher resolution video.

16. The system of claim 15, wherein the low resolution video and global motion vectors are encoded according to a video coding standard selected from the group comprising MPEG-1, MPEG-2, MPEG-4; H.263, H.264 and H.265.

17. The system of claim 16, wherein the global motion vectors are encoded in the data stream, either as auxiliary data in a stream wrapper such as an MPEG-2 transport stream or within the video bit stream such as in a supplemental enhancement information message field of the H.264 standard.

18. The system of claim 17, wherein the global motion vectors are encoded in the supplemental enhancement information message field using non-uniform quantization.

19. The system of claim 14, wherein each frame of the high resolution video is derived from a plurality of frames of the low resolution video and the global motion vectors.

20. The system of claim 19, wherein the plurality of low resolution frames is at least three.

21. The system of claim 19, wherein the derivation of the high resolution video uses compressive sensing.

22. The system of claim 21, wherein the decoder does not include trained dictionaries stored prior to receipt of and corresponding to the received data stream.

23. The system of claim 21, wherein the compressive sensing is used to represent a vectorized block of pixels in a first frame as a linear combination of vectorized blocks of pixels from frames that are temporally proximate to the first frame.

24. The system of claim 14, wherein the decoder further enhances the sharpness of the high resolution video.

25. The system of claim 24, wherein the sharpness of the high resolution video is increased by iteratively applying back-projection.

26. The system of claim 25, wherein the applied back-projection uses nearest neighbor based fusion of low resolution frames.

27. A system of performing video real-time superresolution, comprising:
    an encoder configured to encode a low resolution video by downsampling a high resolution video, deriving global motion vectors relating to image motion between frames of the low resolution video; and
    a decoder configured to receive the encoded low resolution video and global motion vectors and to use the global motion vectors to non-linearly derive a high resolution video from the low resolution video based only on characteristics of the received data stream consisting of the encoded low resolution video and the global motion vectors relating to image motion between frames of the low resolution video and using a partition weighted sum (PWS) filter.

28. The system of claim 27, wherein the low resolution video and global motion vectors are encoded according to a video coding standard selected from the group comprising MPEG-1, MPEG-2, MPEG-4; H.263, H.264 and H.265.

29. The system of claim 28, wherein the global motion vectors are encoded in the data stream, either as auxiliary data in a stream wrapper such as an MPEG-2 transport stream or within the video bit stream such as in a supplemental enhancement information message field of the H.264 standard.

30. The system of claim 27, wherein each frame of the high resolution video is derived from a plurality of frames of the low resolution video and the global motion vectors.

31. The system of claim 27, wherein the decoder does not include trained dictionaries stored prior to receipt of and corresponding to the received data stream.

32. The system of claim 27, wherein the decoder further enhances the sharpness of the high resolution video by iteratively applying a back-projection algorithm.

33. A method of performing real-time video superresolution, comprising:
    receiving at a decoder a data stream representing a low resolution video and global motion vectors relating to image motion between frames of the low resolution video; and
    using partition weighted sum (PWS) filtering to non-linearly derive a high resolution frame for each corresponding low resolution frame, the PWS filtering using quantized vectors to partition an observation space, being spatially adaptive and using a data-adaptive technique for reconstructing missing values, wherein the data-adaptive technique is based only on characteristics of the received data stream consisting of the low resolution video and the global motion vectors relating to image motion between frames of the low resolution video.

34. The method of claim 33, further comprising:
using non-linear gradient-based image registration to register values of reference and non-reference low resolution frames.

35. The method of claim 34, further comprising:
quantizing shifts between the reference and non-reference low resolution frames and populating a high resolution grid.

36. The method of claim 35, further comprising:
iteratively estimating a high resolution frame from the high resolution grid by synthesizing the populated high resolution grids via non-linear back-projection.

37. The method of claim 36, further comprising:
using compressive sensing (CS) to iteratively solve undetermined linear systems.

38. The method of claim 33, wherein the low resolution video and global motion vectors are encoded according to a video coding standard selected from the group comprising MPEG-1, MPEG-2, MPEG-4; H.263, H.264 and H.265.

39. The method of claim 38, wherein the global motion vectors are encoded in the data stream, either as auxiliary data in a stream wrapper or within a video bit stream of the data stream.

40. The method of claim 39, wherein the global motion vectors are encoded in a supplemental enhancement information message field of the H.264 standard.

41. The method of claim 39, wherein the global motion vectors are encoded in an MPEG-2 transport stream.

42. The method of claim 33, wherein each frame of the high resolution video is derived from a plurality of frames of the low resolution video and the global motion vectors.

43. The method of claim 33, further comprising enhancing the sharpness of the high resolution video by iteratively applying a back-projection algorithm.

* * * * *